US 8,515,841 B2

(12) United States Patent
Thalken et al.

(10) Patent No.: US 8,515,841 B2
(45) Date of Patent: Aug. 20, 2013

(54) FINANCIAL PRODUCT APPLICATION PULL-THROUGH SYSTEM

(75) Inventors: Jason Thalken, Reseda, CA (US); Jeffrey Lamarque, Los Angeles, CA (US)

(73) Assignee: Bank of America Corporation, Charlotte, NC (US)

( * ) Notice: Subject to any disclaimer, the term of this patent is extended or adjusted under 35 U.S.C. 154(b) by 365 days.

(21) Appl. No.: 12/879,857

(22) Filed: Sep. 10, 2010

(65) Prior Publication Data
US 2012/0066104 A1     Mar. 15, 2012

(51) Int. Cl.
*G06Q 40/00*     (2012.01)
(52) U.S. Cl.
USPC .......................................................... 705/35
(58) Field of Classification Search
USPC .................................................... 705/35–45
See application file for complete search history.

(56) References Cited

U.S. PATENT DOCUMENTS

| | | | |
|---|---|---|---|
| 6,078,903 A * | 6/2000 | Kealhofer | 705/36 R |
| 7,526,446 B2 * | 4/2009 | Aguais et al. | 705/38 |
| 7,653,593 B2 | 1/2010 | Zarikian et al. | |
| 7,797,230 B1 * | 9/2010 | Barie et al. | 705/38 |
| 7,882,025 B1 * | 2/2011 | Seal et al. | 705/38 |
| 7,974,918 B1 * | 7/2011 | Kunde et al. | 705/38 |
| 8,190,511 B2 * | 5/2012 | Ericksen | 705/38 |
| 8,244,618 B1 * | 8/2012 | Fashenpour et al. | 705/36 R |
| 2006/0059073 A1 * | 3/2006 | Walzak | 705/35 |
| 2006/0271472 A1 * | 11/2006 | Cagan | 705/38 |
| 2007/0250439 A1 * | 10/2007 | Crocker | 705/38 |
| 2011/0047058 A1 * | 2/2011 | Erbey et al. | 705/35 |
| 2011/0078071 A1 * | 3/2011 | Dorai et al. | 705/38 |
| 2011/0173116 A1 * | 7/2011 | Yan et al. | 705/38 |
| 2011/0270779 A1 * | 11/2011 | Showalter | 705/36 R |

OTHER PUBLICATIONS

Crosby, Greg & Mckee, Jay, "The Measurement and Application of Fallout Tendencies: Using fallout tendencies to measure the favorable or unfavorable sensitivity of the hedged pipeline allows risk managers to make informed decisions", Secondary Marketing Executive, copyright 2007, Zackin Publications Inc, pp. 1-3.*
"Interthinkx (TM) Unveils Most Comprehensive Fraud Prevention Tool to Date", Business Wire [New York], Sep. 25, 2006, pp. 1-3.*

(Continued)

*Primary Examiner* — Mohammad Z Shaikh
(74) *Attorney, Agent, or Firm* — Michael A. Springs; Moore and Van Allen PLLC; Patrick B. Horne

(57) ABSTRACT

A method evaluates a prediction set of financial product applications. The method builds a multi-dimensional observation grid of observation grid points, each corresponding to at least one past financial product application in an observation set and each populated with the one or more variable values and the observation result value associated with the past financial product application. The method includes building a multi-dimensional prediction grid comprising a plurality of prediction grid points, each corresponding to a present financial product application in the prediction set and populated with one or more variable values of the present financial product application, each also corresponding to an observation grid point and assigning a prediction result value for each prediction grid point. In some embodiments, the method defines an observation set and a prediction set comprising a past and a present financial product application, respectively, each application including two or more corresponding variable values.

31 Claims, 7 Drawing Sheets

(56) References Cited

OTHER PUBLICATIONS

Mckenna, Frank, "Smarter tools in the fight against fraud: a new generation of fraud-detection tools is helping FHA lenders more effectively fight fraud", Mortgage Banking, Jul. 1, 2010, pp. 1-7.*

Cunningham, Mark, "The Battle for the Borrower: At the end of the day, its all about the customer. The more tools that automate the marketing and sales process, the better position in", Mortgage Technology, 17.8, (Aug. 2010), p. 6.*

* cited by examiner

FINANCIAL PRODUCT APPLICATION PULL-THROUGH SYSTEM

FIELD

In general, embodiments of the invention relate to evaluating financial product applications. More specifically, embodiments of the invention relate to systems for evaluating a cancel and/or deny probability of a financial product application based on past results.

BACKGROUND

Typically, a financial product applicant submits an application for a financial product, such as a loan application or mortgage application, to a financial institution such as a bank. The financial product application includes varying amounts of financial history and credit information. In some instances, an application cannot be completed at the time application initiation, but rather, some information, for example an appraisal of a home or income verification, must be gathered throughout the financial product application process, which, depending on the financial product can be many weeks or more. In some instances a mortgage loan officer (MLO) originating an application has limited visibility into its likelihood of approval, and possibly less visibility into its likelihood of being canceled by the applicant.

In typical financial product applications, a fulfillment team makes approval decisions on application based on predetermined underwriting criteria. Many of the underwriting criteria involve risk management and are related to credit, collateral, income and debt. Further complicating the application process is the fact that some of the data required for an application originates from third parties. Also, most applications require individual attention in order for the fulfillment team to make educated business decisions regarding each application. In certain economic climates, such as periods of low interest rates, a high volume of applications are initiated. Applications are generally processed by fulfillment teams as they are received. Thus, overall fulfillment processing can be drastically improved by optimizing the order of applications around funding rates, which are also referred to as pull-through rates. Pull-through rates refer to the rates at which applications are approved and funds dispersed. The pull-through rates, of course, are negatively influenced by deny or cancel outcomes. A "deny" outcome refers to an application being declined by the financial institution based on an underwriting decision. A "cancel" outcome refers to an application being withdrawn by an applicant before a final decision has been made by the financial institution.

Outcomes are generally time sensitive. The cancel rate of applications increases in a substantially linear fashion beginning from initiation of the application, whereas the pull-through outcomes and deny outcomes are typically determined later in the application timeline due to the necessary information gathering and decision-making process. Hence, a system for evaluating a set of present financial product applications for likelihood of cancel and deny outcomes is needed.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, methods, and computer program products for evaluating a prediction set of financial product applications.

According to embodiments of the present invention, a method for evaluating a prediction set of financial product applications includes defining, by the processing device, a prediction set comprising at least one present financial product application, wherein each financial product application comprises one or more corresponding variable values. The method also includes building, by the processing device, a multi-dimensional prediction grid comprising a plurality of prediction grid points, each prediction grid point corresponding to at least one present financial product application in the prediction set and each prediction grid point populated with one or more variable values of the at least one present financial product application. And finally, the method includes assigning, by the processing device, a prediction result value for each prediction grid point based at least in part on an observation result value.

In some embodiments, the method also includes defining, by a processing device, an observation set comprising at least one past financial product application, wherein the past financial product application comprises one or more corresponding variable values and an observation result value and building, by the processing device, a multi-dimensional observation grid comprising a plurality of observation grid points, each observation grid point corresponding to at least one past financial product application in the observation set and each observation grid point populated with the one or more variable values and the observation result value associated with the at least one past financial product application. In such embodiments, each of the prediction grid points also corresponds to an observation grid point of the observation grid, and a prediction result value is assigned to each prediction grid point based at least in part on the observation result value populated in the observation grid point corresponding with the prediction grid point.

In other embodiments of the method, the multi-dimensional prediction grid is a three dimensional grid wherein each prediction grid point is populated with two variable values and one prediction result value.

In yet other embodiments, the method also includes compressing, by the processing device, the multi-dimensional grid into a single-dimensional grid wherein each prediction grid point is populated consecutively into the single-dimensional grid from lowest prediction result value to highest prediction result value. In some such embodiments, the method also includes stepping through, by the processing device, the single-dimensional grid from lowest prediction result value to highest prediction result value to identify a plurality of grid sections and assigning, by the processing device, a prediction score to each grid section. In some such embodiments, the prediction score assigned to each successive grid section is incrementally assigned from a set of prediction scores. In other such embodiments, the plurality of grid sections are identified based at least in part on a predetermined percentage of the number of prediction grid points having been stepped through. In some of these embodiments, the predetermined percentage of the number of prediction grid points stepped through is five percent and the plurality of grid sections comprises twenty grid sections. In some of these embodiments, the prediction score assigned to each successive grid section is incrementally assigned from a set of prediction scores comprising scores of zero to nineteen, and wherein the prediction score assigned to each successive grid section is incrementally assigned starting with zero and ending with nineteen.

In some embodiments, the method also includes calculating, by the processing device, the observation result value populated with each observation grid point. Calculating includes dividing, by the processing device, the number of past financial product applications in the observation set having a negative result status corresponding with the observation grid point by the total number of past financial product applications in the observation set corresponding with the observation grid point, thereby resulting in the observation result value for the observation grid point. In some such embodiments, the negative result status comprises the past financial product application having been canceled by a customer. In other such embodiments, the negative result status comprises the past financial product application having been denied by a financial institution.

In some embodiments, the method also includes dividing, by the processing device, the prediction set into groups based at least in part on one or more variables associated with the one or more variable values, building, by the processing device, a multi-dimensional prediction grid for each group, each multi-dimension prediction grid comprising a plurality of prediction grid points, and assigning, by the processing device, a prediction result value for each prediction grid point for each multi-dimensional prediction grid for each group.

In some embodiments, the method also includes initiating production, by the processing device, of a list of the present financial product applications of the prediction set, the list including the prediction result value assigned to the prediction grid point corresponding to each present financial product application.

According to embodiments of the present invention, a system for evaluating a prediction set of financial product applications includes a processing device configured for defining a prediction set comprising at least one present financial product application, wherein each financial product application comprises one or more corresponding variable values, building a multi-dimensional prediction grid comprising a plurality of prediction grid points, each prediction grid point corresponding to at least one present financial product application in the prediction set and each prediction grid point populated with one or more variable values of the at least one present financial product application, and assigning a prediction result value for each prediction grid point based at least in part on an observation result value.

In some embodiments, the processing device is further configured for defining an observation set comprising at least one past financial product application, wherein the past financial product application comprises one or more corresponding variable values and an observation result value and building a multi-dimensional observation grid comprising a plurality of observation grid points, each observation grid point corresponding to at least one past financial product application in the observation set and each observation grid point populated with the one or more variable values and the observation result value associated with the at least one past financial product application In such embodiments, each of the prediction grid points also corresponds to an observation grid point of the observation grid, and a prediction result value is assigned to each prediction grid point based at least in part on the observation result value populated in the observation grid point corresponding with the prediction grid point.

In some embodiments, the multi-dimensional prediction grid is a three dimensional grid wherein each prediction grid point is populated with two variable values and one prediction result value.

In some embodiments, the processing device is further configured for compressing the multi-dimensional grid into a single-dimensional grid wherein each prediction grid point is populated consecutively into the single-dimensional grid from lowest prediction result value to highest prediction result value. In some such embodiments, the processing device is further configured for stepping through the single-dimensional grid from lowest prediction result value to highest prediction result value to identify a plurality of grid sections and assigning a prediction score to each grid section. In some such embodiments, the prediction score assigned to each successive grid section is incrementally assigned from a set of prediction scores.

In other such embodiments, the plurality of grid sections are identified based at least in part on a predetermined percentage of the number of prediction grid points having been stepped through. In some of these embodiments, the predetermined percentage of the number of prediction grid points stepped through is five percent and the plurality of grid sections comprises twenty grid sections. In some of these embodiments, the prediction score assigned to each successive grid section is incrementally assigned from a set of prediction scores comprising scores of zero to nineteen, and wherein the prediction score assigned to each successive grid section is incrementally assigned starting with zero and ending with nineteen.

In some embodiments, the processing device is further configured for calculating the observation result value populated with each observation grid point. Calculating includes dividing, by the processing device, the number of past financial product applications in the observation set having a negative result status corresponding with the observation grid point by the total number of past financial product applications in the observation set corresponding with the observation grid point, thereby resulting in the observation result value for the observation grid point. In some such embodiments, the negative result status comprises the past financial product application having been canceled by a customer. In other such embodiments, the negative result status comprises the past financial product application having been denied by a financial institution.

In some embodiments, the processing device is further configured for dividing the prediction set into groups based at least in part on one or more variables associated with the one or more variable values, building, by the processing device, a multi-dimensional prediction grid for each group, each multi-dimension prediction grid comprising a plurality of prediction grid points, and assigning a prediction result value for each prediction grid point for each multi-dimensional prediction grid for each group.

In some embodiments, the processing device is further configured for initiating production of a list of the present financial product applications of the prediction set, the list including the prediction result value assigned to the prediction grid point corresponding to each present financial product application.

According to embodiments of the present invention, a computer program product includes a non-transient computer-readable medium including instructions for evaluating a prediction set of financial product applications. The instructions include instructions for defining a prediction set comprising at least one present financial product application, wherein each financial product application comprises one or more corresponding variable values. The instructions also include instructions for building a multi-dimensional prediction grid comprising a plurality of prediction grid points, each prediction grid point corresponding to at least one present financial product application in the prediction set and each prediction grid point populated with one or more variable values of the at least one present financial product application and instructions for assigning a prediction result value for each prediction grid point based at least in part on an observation result value.

In some embodiments, the instructions also include instructions for defining an observation set comprising at least one past financial product application, wherein the past financial product application comprises one or more corresponding variable values and an observation result value and instructions for building a multi-dimensional observation grid comprising a plurality of observation grid points, each observation grid point corresponding to at least one past financial product application in the observation set and each observation grid point populated with the one or more variable values and the observation result value associated with the at least one past financial product application. In such embodiments, each of the prediction grid points also corresponds to an observation grid point of the observation grid, and a prediction result value is assigned to each prediction grid point based at least in part on the observation result value populated in the observation grid point corresponding with the prediction grid point.

In some embodiments, the multi-dimensional prediction grid is a three dimensional grid wherein each prediction grid point is populated with two variable values and one prediction result value.

In some embodiments, the instructions also include instructions for compressing the multi-dimensional grid into a single-dimensional grid wherein each prediction grid point is populated consecutively into the single-dimensional grid from lowest prediction result value to highest prediction result value. In some such embodiments, the instructions also include instructions for stepping through the single-dimensional grid from lowest prediction result value to highest prediction result value to identify a plurality of grid sections and instructions for assigning a prediction score to each grid section. In some such embodiments, the prediction score assigned to each successive grid section is incrementally assigned from a set of prediction scores.

In some embodiments, the plurality of grid sections are identified based at least in part on a predetermined percentage of the number of prediction grid points having been stepped through. In some such embodiments, the predetermined percentage of the number of prediction grid points stepped through is five percent and the plurality of grid sections comprises twenty grid sections. In some such embodiments, the prediction score assigned to each successive grid section is incrementally assigned from a set of prediction scores comprising scores of zero to nineteen, and wherein the prediction score assigned to each successive grid section is incrementally assigned starting with zero and ending with nineteen.

In some embodiments, the instructions also include instructions for calculating the observation result value populated with each observation grid point. The instructions for calculating include instructions for dividing the number of past financial product applications in the observation set having a negative result status corresponding with the observation grid point by the total number of past financial product applications in the observation set corresponding with the observation grid point, thereby resulting in the observation result value for the observation grid point. In some such embodiments, the negative result status comprises the past financial product application having been canceled by a customer. In other such embodiments, the negative result status comprises the past financial product application having been denied by a financial institution.

In some embodiments, the instructions also include instructions for dividing the prediction set into groups based at least in part on one or more variables associated with the one or more variable values, instructions for building, by the processing device, a multi-dimensional prediction grid for each group, each multi-dimension prediction grid comprising a plurality of prediction grid points, and instructions for assigning a prediction result value for each prediction grid point for each multi-dimensional prediction grid for each group.

In some embodiments, the instructions also include instructions for initiating production of a list of the present financial product applications of the prediction set, the list including the prediction result value assigned to the prediction grid point corresponding to each present financial product application.

According to embodiments of the present invention, a method for evaluating a prediction set of financial product applications includes defining, by a processing device, an observation set comprising at least one past financial product application, wherein the past financial product application comprises one or more corresponding variable values and an observation result value, defining, by the processing device, a prediction set comprising at least one present financial product application, wherein each financial product application comprises one or more corresponding variable values, and building, by the processing device, a multi-dimensional observation grid comprising a plurality of observation grid points, each observation grid point corresponding to at least one past financial product application in the observation set and each observation grid point populated with the one or more variable values and the observation result value associated with the at least one past financial product application. The method also includes building, by the processing device, a multi-dimensional prediction grid comprising a plurality of prediction grid points, each prediction grid point corresponding to at least one present financial product application in the prediction set and each prediction grid point populated with one or more variable values of the at least one present financial product application, each of the prediction grid points also corresponding to an observation grid point of the observation grid and assigning, by the processing device, a prediction result value for each prediction grid point based at least in part on the observation result value populated in the observation grid point corresponding with the prediction grid point.

The following description and the annexed drawings set forth in detail certain illustrative features of one or more embodiments of the invention. These features are indicative, however, of but a few of the various ways in which the principles of various embodiments may be employed, and this description is intended to include all such embodiments and their equivalents.

BRIEF DESCRIPTION OF THE DRAWINGS

Figure 1:
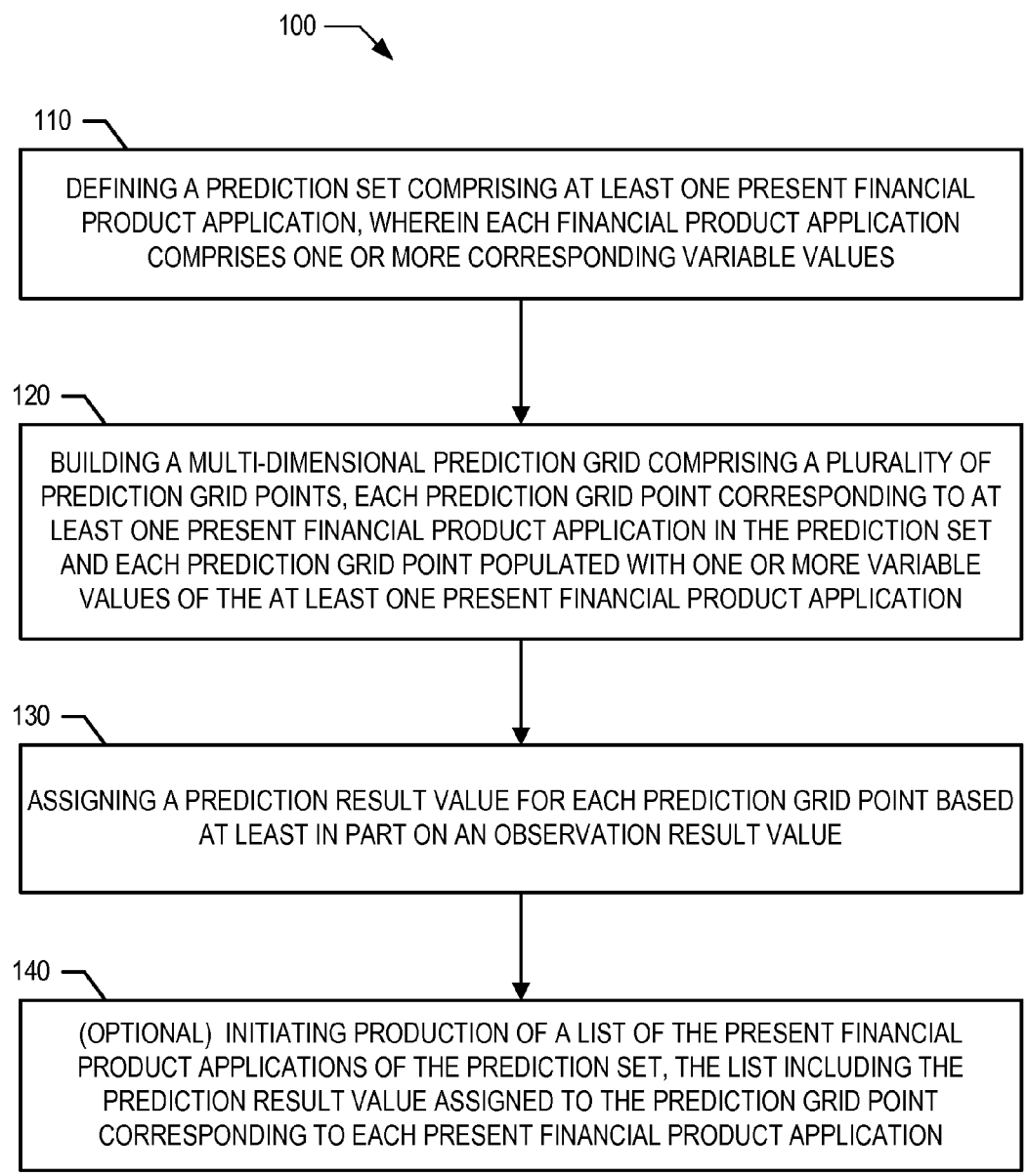
Figure 2:
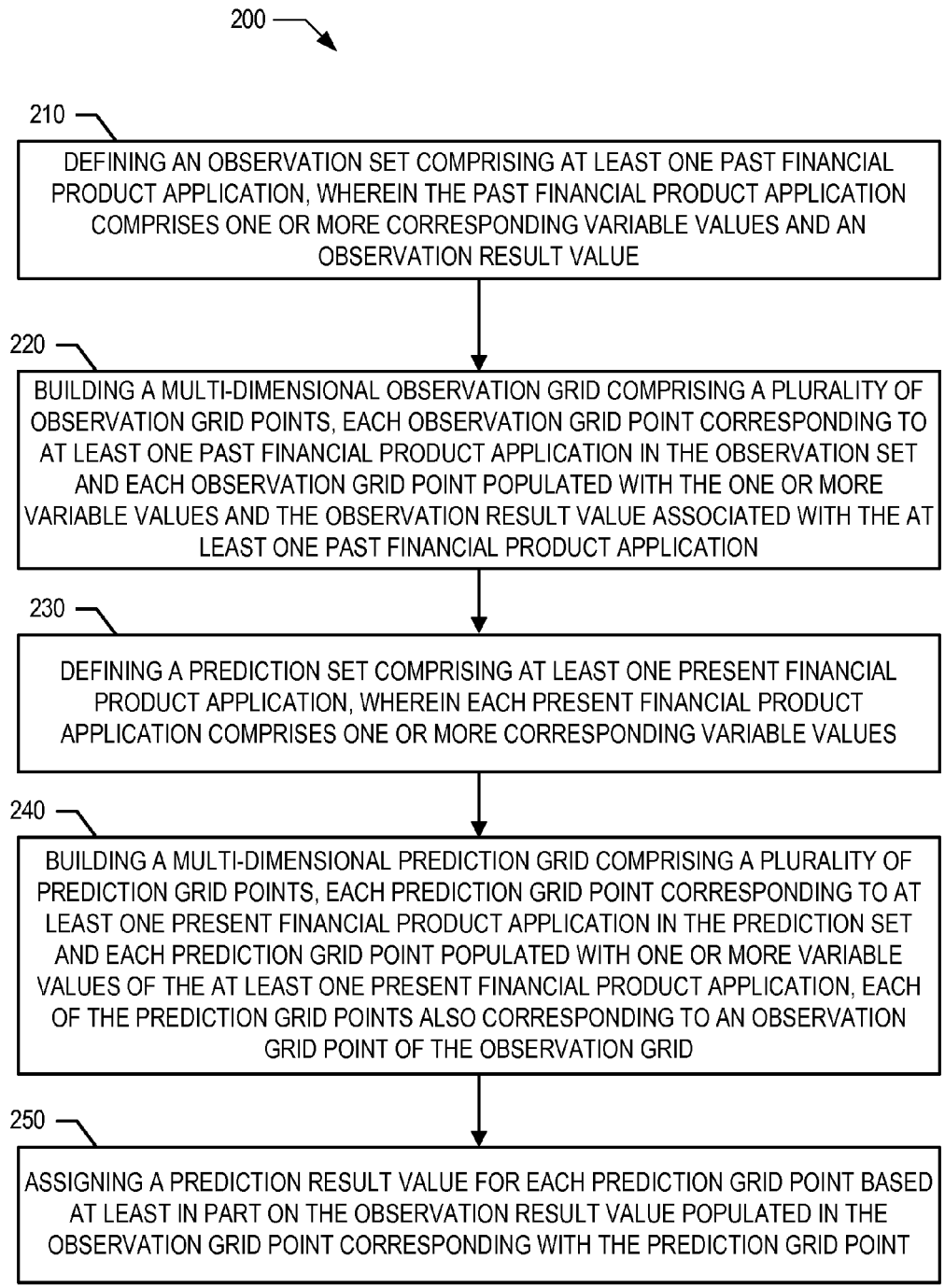
Figure 3:
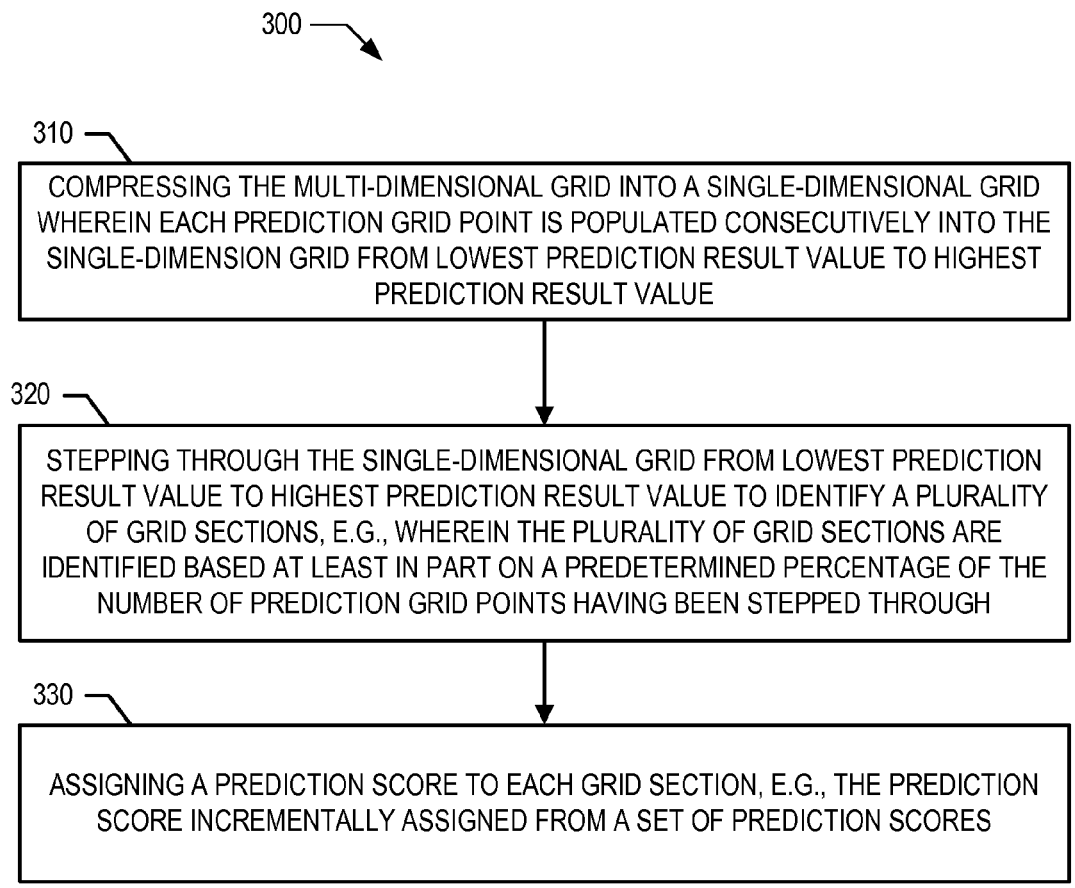
Figure 4:
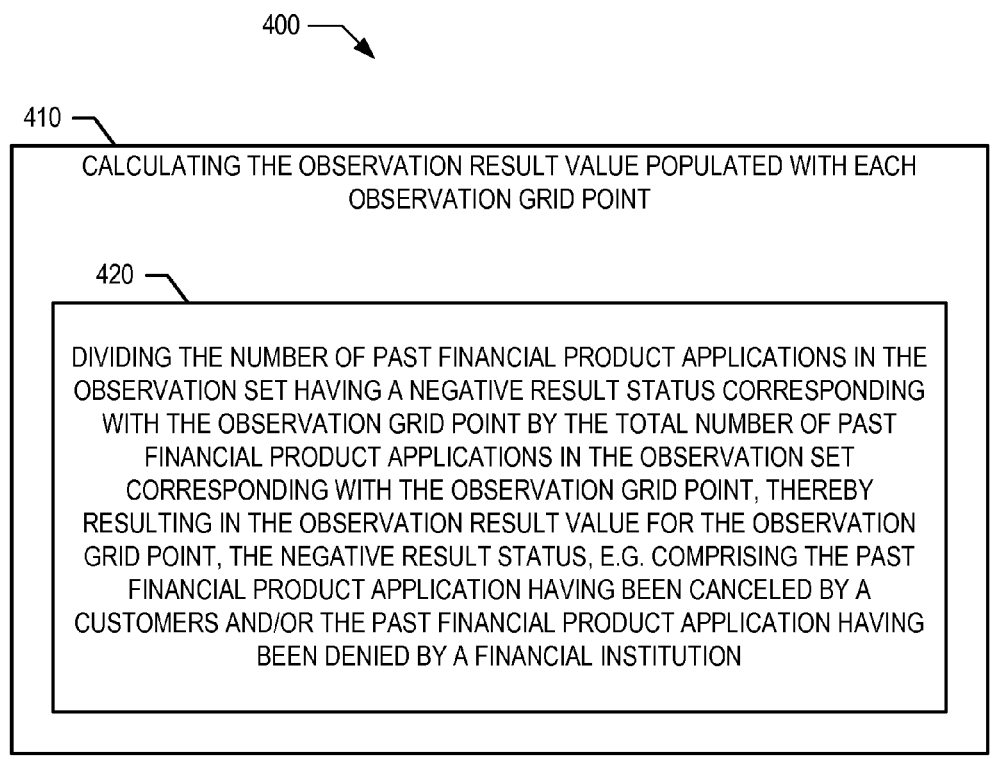
Figure 5A:
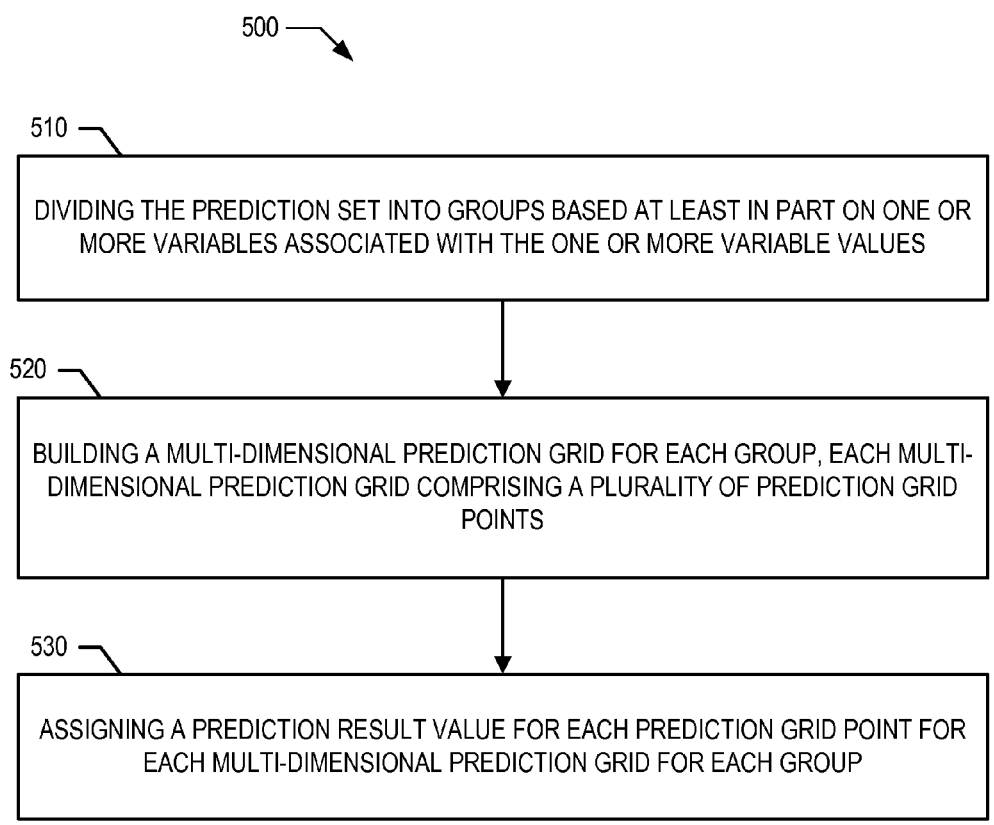
Figure 5B:
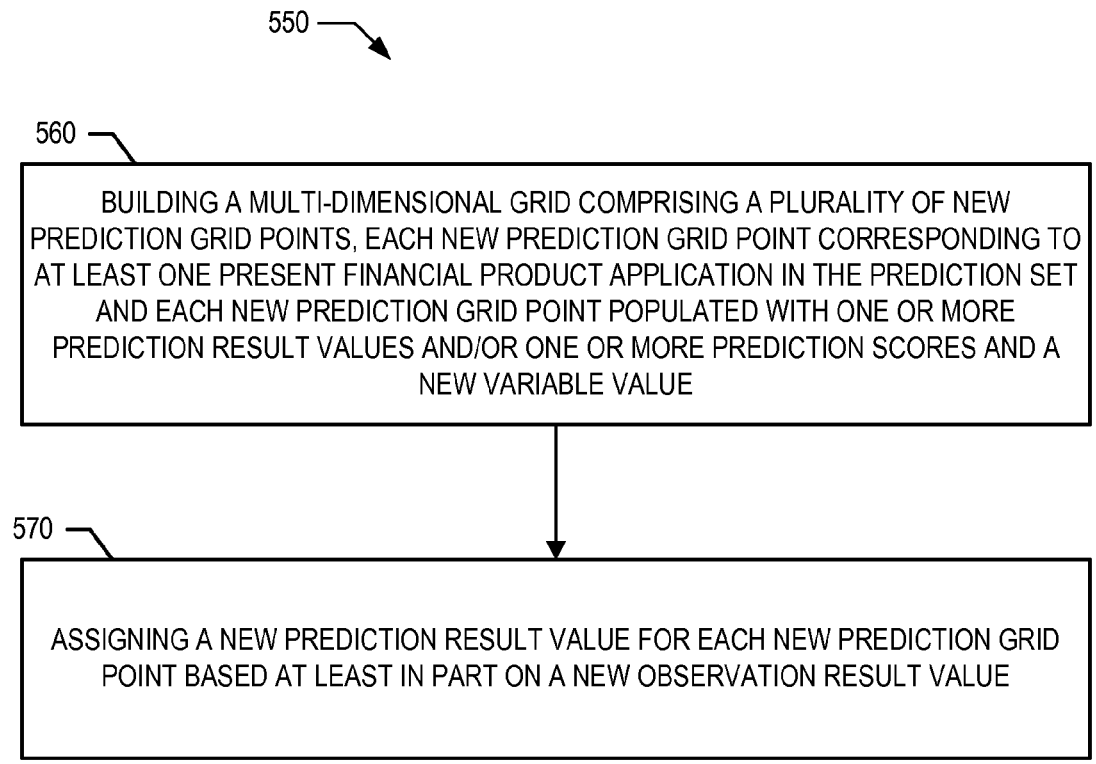
Figure 6:
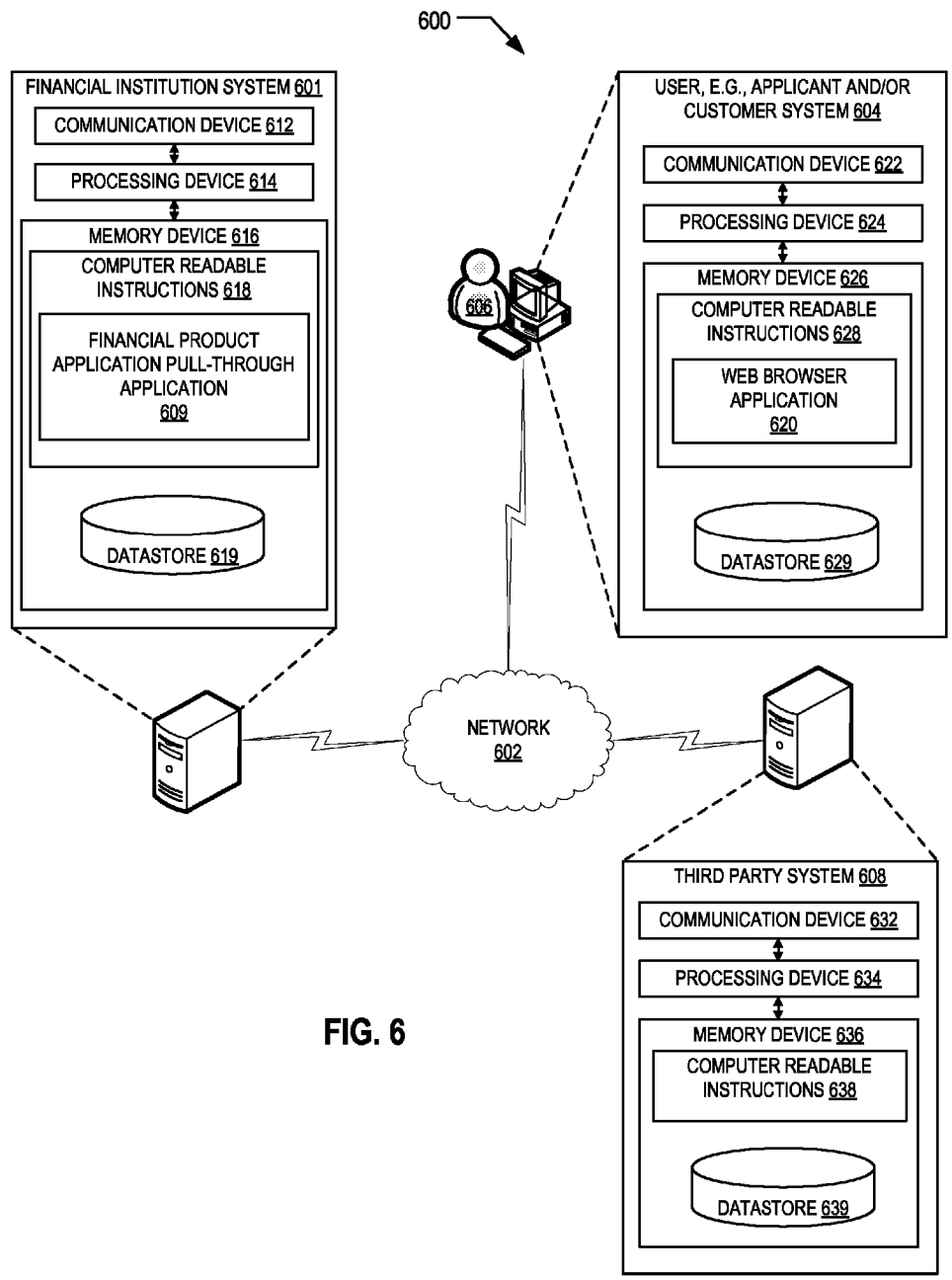

Having thus described embodiments of the invention in general terms, reference will now be made to the accompanying drawings, wherein:

FIG. 1 is a flowchart illustrating a method for evaluating a prediction set of financial product applications according to embodiments of the present invention;

FIG. 2 is a flowchart illustrating another method for evaluating a prediction set of financial product applications according to embodiments of the present invention;

FIG. 3 is a flowchart illustrating additional details of the methods illustrated in FIGS. 1 and 2 according to embodiments of the present invention;

FIG. 4 is a flowchart illustrating additional details of the method illustrated in FIGS. 1 and 2 according to embodiments of the present invention;

FIG. 5A is a flowchart illustrating additional details of the methods illustrated in FIGS. 1 and 2 according to embodiments of the present invention;

FIG. 5B is a flowchart illustrating additional details of the methods illustrated in FIGS. 1 and 2 according to embodiments of the present invention; and FIG. 6 is a block diagram illustrating an environment in which the system of the present invention operates according to embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

The system of the present invention predicts the likelihood of an outcome, such as a cancel outcome or a deny outcome for a new, present loan application based on historical trends. Variables tending to indicate cancel outcomes can be difficult to identify because they involve some applicant behavioral factors that are difficult or impossible to measure. For example, in some cases, interest rates higher than the market rate could drive an applicant to a competing lender. As another example, an application involving new complications, such as adding mortgage insurance may be perceived by an applicant as undesirable and therefore result in the applicant choosing to cancel the application. Variables tending to indicate deny outcomes can be easier to identify, because they are related to measurable and known underwriting standards. For example, any variable related to credit or risk is likely to indicate a higher chance of the application being denied by the financial institution.

Embodiments of the invention provide for systems, methods and computer program products for evaluating a prediction set of financial product applications. A method for evaluating a prediction set of financial product applications includes building a multi-dimensional observation grid of observation grid points, each corresponding to at least one past financial product application in an observation set and each populated with the one or more variable values and the observation result value associated with the past financial product application. The method also builds a multi-dimensional prediction grid comprising a plurality of prediction grid points, each corresponding to a present financial product application in the prediction set and populated with one or more variable values of the present financial product application, each also corresponding to an observation grid point. The method also includes assigning a prediction result value for each prediction grid point. In some embodiments, the method defines an observation set and a prediction set comprising at least one past, and at least one present, financial product application, respectively, each application including one or more corresponding variable values.

The system provides the opportunity, based on the prediction result value for each prediction grid point, and the application(s) corresponding to the prediction grid point to prioritize and/or sort the present applications for processing. In this regard, the applications, in some embodiments, that are most likely to be canceled can be processed first. Or, in another embodiment, the application most likely to be canceled can be processed last. In other embodiments, the application most likely to be denied can be processed first, and in other embodiments, the applications most likely to be denied can be processed last. In yet other embodiments, some combination of likelihood of cancel and likelihood of deny is considered regarding the order of application processing. The system also provides the opportunity to train or coach an MLO by illustrating the variables to look for in a particular application. For example, the system may indicate that an application has a high likelihood of cancel, and the MLO can then watch that application through the process to see when and if the application was canceled and for what reason it was canceled. In this regard, the MLO may be trained to better catch applications with red flags for cancel or deny outcomes. Importantly, the system provides a uniform method to compare application across small data sets, including the pipelines of individual MLOs or small groups of MLOs.

The system draws from a variety of data sources in various embodiments. For example, in some embodiments, information regarding a current loan maintained by the financial institution processing the current application is considered. For example, a customer of a financial institution who currently has a loan serviced by the financial institution has already shared a significant amount of information with the financial institution, which the financial institution can retrieve from a database. Furthermore, during the life of a loan the financial institution typically updates the customer's information, so information retrieved from a database regarding a serviced loan can be considered at least somewhat reliable. Of course, a great source of the data used by the system is the information submitted in the new application for a financial product. Other sources include market data, such as, for example, publicly available environmental and industry data and, of course, third party data indicating credit history and/or scores and similar information.

In some embodiments, the methods of the invention account for different customer or applicant groups, based on the groups' relationships with the predictive variables used by the methods to predict the application outcomes. In other words, applications are divided into different mutually exclusive groups. Typically, each group relates to the variables used by the system differently. That is, depending on the group, different variables have been identified as strong indicators of particular outcomes. For example, every group listed below has a unique, maximum allowable CLTV (discussed below) or a maximum CLTV for a given FICO (discussed below) band. Thus, each group has different cancel rates and/or deny rates for a given FICO and CLTV profile. Examples of groups include, but are not limited to, Government Purchase Applications (e.g., FHA, VA), Conventional Purchase Applications, Making Home Affordable (MHA) Refinance Applications, Conventional Refinance Applications with Cash Out, Government Refinance Applications with Cash Out (e.g., FHA, VA), Conventional Refinance Applications with no Cash Out, Government Refinance Applications with no Cash Out (e.g., FHA, VA), and Second Lien Applications.

Generally speaking, one or more variables are combined by the system once the variables that are predictive of the particular outcome under consideration are identified. In various other embodiments, different groupings are defined and the applications are divided into those different groups. In some instances, it may be advantageous to define additional, fewer and/or different groups if there is reason to believe such defined groupings would better separate applications with different relationships to the underlying variables being used by the system to determine cancel and/or deny rates.

Certain variables have been identified that strongly indicate cancel outcomes. Those variables include, but are not limited to, Income, PMI Transaction (Private Mortgage Insurance Transaction), and New Product Type. The Income variable is a continuous variable sourced from customer data and refers to a monthly household income. The Income variable is typically furnished from third party bureau data. The PMI Transaction variable is a discrete variable sourced from current loan and/or new application data. The PMI Transaction variable refers to whether private mortgage insurance is required for the current loan and the financial product for which the application is submitted. The New Product Type variable is a discrete variable sourced from new loan application data. The New Product Type variable refers to a product type (i.e., Conventional or Government) of the financial product for which the application is submitted.

Certain variables have been identified that strongly indicate deny outcomes. Those variables include, but are not limited to, Branch Type, Cashout Flag, Combined Loan-to-Value (CLTV) Difference, Delinquent Type, Rate Difference, and Self Employed Flag. The Branch Type variable is a binary variable sourced from new application data. The Branch Type variable indicates whether the application initiated through a distributed retail branch or centralized sales. The Cashout Flag is a binary variable sourced from new application data. The Cashout Flag denotes an application that involves taking cash out along with the financial product for which the application is submitted. The CLTV Difference variable is a continuous variable sourced from customer data and/or geographic data. The CLTV Difference variable refers to the difference between the property related to the financial product loan-to-value ratio and the average loan-to-value in the county where the property rests. The Delinquent Type variable is a binary variable sourced from current loan data. The Delinquent Type variable indicates a delinquent payment in the past twelve (12) months. The Rate Difference variable is a continuous variable sourced from new application data and/or market data. The Rate Difference variable refers to the difference between the new financial product application interest rate and the current market interest rate. In some embodiments, the Freddie Mac 30-year fixed rate is used as the standard. The Self Employment Flag is a binary variable sourced from current loan information. The Self Employment Flag indicates whether the applicant was self-employed when the current loan was obtained.

Certain variables have been identified that provide additional indications regarding cancel and deny outcomes. Those variables include, but are not limited to, an ARM Flag, CLTV, Commit Period, Division, FICO, GPM, Term Change, and State. The ARM Flag is a binary variable sourced from new application data that denotes an application for an adjustable rate mortgage. The CLTV variable is a continuous variable sourced from customer data and/or home price index data. The CLTV variable refers to the estimated combined loan-to-value ratio on the current loan, based on home price index data. The Commit Period is a discrete variable sourced from new application data and referring to the duration of interest rate lock period during the loan application process. In some embodiments, the period is calculated in days. The Division variable is a discrete variable sourced from current loan data and referring to the division, i.e., either within the financial institution or outside the financial institution, from which the current loan was originated. The FICO is a continuous variable sourced from customer data and referring to a credit reporting agency's or bureau's credit score for the applicant. In some embodiments, the FICO variable is based on quarterly refresh rates. The GPM variable is a continuous variable sourced from inside the financial institution and referring to gross profit margin associated with the application and financial product associated with the application. The Term Change variable is a discrete variable sourced from current loan data and/or new application data and refers to the difference between the current loan term (generally in months) and the term of the financial product, such as a loan, for which the application is submitted. The State variable is a discrete variable sourced from geographic data and refers to the location by state of a property associated with the financial product for which the application is submitted. For example, the State variable indicates the state of the address of a home for which a mortgage application has been submitted.

Certain additional variables have been identified that provide additional indications regarding deny outcomes. Those variables include, but are not limited to, an Application Amount, City Score, FTB Flag, High Risk Flag, and Property Value. The Application Amount variable is a binary variable sourced from new application data and indicates whether the loan amount for which the application is submitted is over $417,000.00, which is the conforming limit in most areas (i.e., the limit over which a "jumbo" loan must be used). In other embodiments, different thresholds are used, and in some embodiments, the Application Amount is a continuous variable sourced from the new application data and indicating the amount requested in the application. The City Score variable is a continuous variable sourced from current loan data and/or geographic data. The City Score variable is a proprietary algorithm used to quantify how "urban" a property location is, based on distance from major cities. The FTB Flag is a binary variable sourced from current loan data and denotes applicants whose current loans were obtained as first-time borrowers. The High Risk Flag is a binary variable sourced from current loan data that captures certain high risk categories regarding a current loan. For example, the High Risk Flag may include expanded approval, such as modified underwriting criteria, and interest-only loans. The Property Value is a continuous variable sourced from current loan data and/or home price index data that refers to an estimate of the property value associated with the current loan based on the home price index.

Certain additional variables have been identified that may provide additional indications regarding cancel and/or deny outcomes. Those variables include, but are not limited to, DTI, Occupation, Property Type, Soft Market, Old Loan Type, Insurance Difference, and Property Size. The DTI variable is a continuous variable sourced from new application data and/or third party data. The DTI refers o the debt to income ratio of the borrower. The Occupation variable is a discrete variable sourced from either current loan data or new application data and refers to whether the property associated with a current loan or the property associated with the new application is owner occupied, a second home, or investment property. The Property Type variable is a discrete variable sourced from either the current loan data or new application data and indicating whether the property associated with a current loan or the property associated with the new application is a single family residence, condo, 2 to 4 unit property and the like. The Soft Market variable is a discrete variable sourced from third party market data and/or financial institution market data and indicating how rapidly local properties have declined in value. In some embodiments, the Soft Market variable is assigned a numerical rank from one to five or assigned some other numerical rank based on some other metric. The Old Loan Type variable is a discrete variable sourced from current loan data and/or third party data and indicating the type of the current loan, for example, whether the current loan is a conventional or government loan. The Insurance Difference variable is a discrete variable sourced from current loan data and new application data and indicating a comparison between the current loan and the new application to determine whether mortgage insurance has been added or removed as between the current loan and the new application. The Property Size variable is a discrete or continuous variable sourced from the new application data and indicating the number of bedrooms and/or square footage of the property associated with the application submitted.

It should be understood, of course, that many different types of variables, discrete, continuous or otherwise can be used by the system and those discussed herein are not an exhaustive listing. Various other pieces of data used and/or variables that may be used by the system include any information available to the financial institution such as internal information regarding any type of account, such as a debit and/or credit account or other type of account or external information regarding the same or otherwise. Information regarding environmental and industry data such as home price trending, unemployment and population density, just to name a few may be used in some embodiments. In some embodiments, as discussed above regarding some of the variables, the variables used are comparative in nature, such as comparing data by taking the difference between the note rate on a new application and the note rate on a current loan.

Referring now to FIG. 1, a flowchart illustrating a method 100 for evaluating a prediction set of financial product applications is shown. The first step, as illustrated by block 110 is defining a prediction set including at least one present financial product application. Each financial product application includes or is associated with one or more corresponding variable values. The prediction set typically includes financial product applications from a window of time in the recent past and which are selected in order to be evaluated, such as, for example, to be evaluated to determine one or more prediction result values and/or prediction scores as discussed further below.

The next step, as illustrated by block 120, is building a multi-dimensional prediction grid comprising a plurality of prediction grid points. Each prediction grid point corresponds to at least one present financial product application in the prediction set. Also, each prediction grid point is populated with one or more variable values of the at least one present financial product application.

The next step, as illustrated by block 130, is assigning a prediction result value for each prediction grid point based at least in part on an observation result value. Determining the observation result value is discussed with further detail below.

In some embodiments, as illustrated by optional step 140, the next step is initiating production of a list of the present financial product applications of the prediction set. The list, in some embodiments, includes the prediction result value assigned to the prediction grid point corresponding to each present financial product application. In some embodiments, the list includes the prediction score discussed further below. In some embodiments, the list is uploaded to a separate system, such as a remote server, and in yet other embodiments, the list is sent to business partners such as via email. In some embodiments, the list is stored locally, and in others it is analyzed by the system or manually by a financial institution associate. In some instances, such analyses are helpful in that the third party can re-prioritize applications based on the information, provide special treatment to applications at high risk for cancel and/or deny outcomes, or otherwise use the information to improve application consideration. In some embodiments, the data in the list is used as an input to a separate system for evaluating the actual cancel and/or deny outcome rates associated with various groups of applications, such as the various grid sections. This provides further information so that the system can be refined and improved.

Referring now to FIG. 2, a flowchart illustrates another method 200 for evaluating a prediction set of financial product applications according to embodiments of the present invention. The first step, as illustrated by block 210, is defining an observation set comprising at least one past financial product application. In some embodiments, the past financial product application is associated with or comprises one or more corresponding variable values and an observation result value. The observation set, in some embodiments, includes past financial product applications, which have typically reached an outcome. That is, the past financial product applications have either been canceled, denied, funded or some other outcome. Hence, each of the past financial product applications is associated with or corresponds to an outcome, which is used as discussed below with reference to FIG. 4 to calculate the observation result value. In some embodiments, the observation set includes applications that were either initiated or reached an outcome within a predetermined window of time. For example, all the applications initiated at a financial institution during a specified month may be chosen by the system for the observation set.

The next step, as represented by block 220, is building a multi-dimensional observation grid comprising a plurality of observation grid points. Each observation grid point corresponds to at least one past financial product application in the observation set. Also, each observation grid point is populated with one or more variable values and the observation result value associated with the at least one past financial product application. In some embodiments, each observation grid point corresponds to several past financial product applications and is populated with one or more variable values and the observation result value associated with the several past financial product applications. In some embodiments, each observation grid point corresponds to a very large number of past financial product applications and is populated with one or more variable values and the observation result value associated with the many past financial product applications. In some embodiments, each observation grid point corresponds with one or more past financial product applications and is populated with and/or corresponds to one or more variable values and an observation result value associated with the one or more past financial product applications. In some embodiments, each observation grid point corresponds with one or more past financial product applications and is populated with and/or corresponds to one or more variable value ranges and an observation result value associated with the one or more past financial product applications.

For example, in some embodiment, each observation grid point corresponds with multiple financial product applications and corresponds to and/or is populated with one or more variable value ranges and is populated with one or more observation result values. In one such embodiment, for example, a variable being used is the FICO score variable, and an observation grid point corresponds with a FICO score range, such as 550 to 600. Another observation grid point corresponds with a FICO score range of 600 to 650 and so on. Each observation grid point corresponds with the past financial product applications that fall into the appropriate FICO score range. In this example, several past financial product applications fall into the particular FICO score range associated with an observation grid point, and, as discussed further below, those past financial product applications are then used to determine the observation result value. In one example embodiment, the observation result value is associated with a cancel rate of those applications associated with the particular observation grid point, and in another example embodiment, the observation result value is associated with a deny rate of those applications associated with the particular observation grid point.

In some embodiments, multiple variables are used, and in some embodiments, multiple variable ranges are used to build the observation grid and observation grid points. For example, in one embodiment, two variables are used such that a particular range of the first variable and a particular range of the second variable are associated with one observation grid point in the observation grid. Thus, any past financial product applications in the observation set meeting those criteria, that is, having variable values falling within the particular ranges associated with the observation grid point are associated with that particular observation grid point. Then, as discussed below, those applications and their associated outcomes are used in determining the observation result value associated with that particular observation grid point. In some embodiment, more than one observation result value is associated with a particular observation grid point. For example, in one embodiment, one observation result value represents a cancel rate for the applications associated with or corresponding to the particular observation grid point, and another observation result value represents a deny rate for the applications associated with or corresponding to the particular observation grid point.

The next step, as represented by block 230, is defining a prediction set comprising at least one present financial product application. Each present financial product application comprises or is associated with one or more corresponding variable values. Similar to steps 110 and 210, step 230 involves defining a set of applications. In various embodiments, some or all of steps 110, 210, and/or 230 include querying a database collocated with the financial institution system, or for example, a database located at the third party system of FIG. 6, in order to locate all applications within the specified time ranges. In other embodiments, as discussed above, the applications for the observation set and/or the prediction set are chosen in various other ways, such as, based on one or more other characteristics of the applications.

Also included in embodiments of steps 110, 210 and/or 230 is querying one or more databases regarding the variable values to be used to calculate the cancel and deny rates for each application within the prediction set. Generally, the variable values, such as, for example, the FICO scores of the applicants for each application within the observation set as well as the prediction set, are retrieved concurrently or substantially concurrently with the application outcomes of the observation set applications. Of course, the prediction set applications do not typically have an outcome at this stage.

As discussed above, there are a number of variables that can be used by the system. Some of the variables require one or more intermediate calculations, comparisons, compilations of values retrieved from multiple servers or systems, or some other conditioning or processing in order to yield a meaningful variable for use by the system. In some embodiments, all the variable values associated with each of the applications, both in the observation set and the prediction set as well as the outcome values associated with the observation set applications are stored locally, such as by using PERL hashes, for example.

In some embodiments, as discussed below with regard to FIG. 5, the applications can be divided into distinct groups, such as, for example, eight groups such that the variables investigated regarding each of the groups are either different and/or yield different, expected results based on certain characteristics of the defined groups. For example, in some embodiments, the variables investigated with regard to the different groups are the same but the variable values will tend to have different slopes or critical points when considered with respect to time as between the various groups.

The next step, as represented by block 240, is building a multi-dimensional prediction grid comprising a plurality of prediction grid points. Each prediction grid point corresponds to at least one present financial product application in the prediction set. Also, each prediction grid point is populated with one or more variable values of the at least one present financial product application. Further, each of the prediction grid points also corresponds to an observation grid point of the observation grid.

In some embodiments, the prediction grid is a two-dimensional grid where each of the prediction grid points includes variable values for two variables, such as, for example, a FICO and a CLTV value. In some embodiments where the applications are divided into groups, a separate grid is built for each group. In some embodiments, multiple grids are built for multiple outcome types. That is, an observation grid and a prediction grid are built for both cancel outcomes and for deny outcomes. In some embodiments, the observation grids are combined and the prediction grids are combined such that one observation grid is built for both cancel outcomes as well as deny outcomes and one prediction grid is built for both cancel outcomes and deny outcomes.

As discussed above regarding the observation set and building the observation grid in step 220, the prediction grid points of the prediction grid, in various embodiments, may be associated with several or many present financial product applications in the prediction set. In some embodiments, each prediction grid point, similar to the observation grid points, may be associated with one or more variable ranges rather than discrete variable values such that present financial product applications in the prediction set falling into particular variable ranges are associated with the corresponding prediction grid point. In some embodiments, for example, the observation grid points are built into the observation grid based on variable values and/or variable ranges that are the same as or correspond with variable values and/or variable ranges used to build to the prediction grid points. In this regard, the past financial product applications associated with a particular observation grid point and the present financial product applications associated with the prediction grid point corresponding to the observation grid point are related, and, in some embodiments, have variable values falling within similar or the same ranges. In some embodiments, each prediction grid point corresponds to and/or is populated with more than one prediction result value as discussed further below.

Finally, the next step, as represented by block 250, is assigning a prediction result value for each prediction grid point based at least in part on the observation result value populated in the observation grid point corresponding with the prediction grid point. This step, in some embodiments, creates a three-dimensional grid including, for example, the two variable values discussed above, as well as the prediction result value. The prediction result value is based at least in part on the observation result value, which is associated with the matching or corresponding grid point in the observation grid. Hence, by comparing the variable values of the grid points within the prediction grid with the variable values of the grid points within the observation grid, corresponding grid points between the two are determined. Then, the observation result value is read from the appropriate grid point of the observation grid and used to determine or assign the prediction result value to the appropriate grid point of the prediction grid. In some embodiments, the observation result value is a number or value that is simply copied to the corresponding grid point of the prediction grid, and in other embodiments, the observation result value is a factor or some other value, equation or information used to calculate or determine the prediction result value for the corresponding grid point of the prediction grid.

For example, in one embodiment, the observation result value is a ratio of the number of canceled application to the total number of applications in the observation set or within the particular grid point of interest within the observation grid. The ratio is applied to the appropriate data within the prediction set, namely, the total number of applications associated with or corresponding to the prediction grid point of interest, in order to determine the prediction result value. In another embodiment, the observation result value is a ratio, such as the ratio discussed in the above example, and the observation result value is simply copied to the corresponding prediction grid point and saved as the prediction result value. In other embodiments, for example, the observation result value is a ratio of the number of denied applications to the total number of applications in the observation set or in within the particular grid point of interest within the observation grid.

In some instances, insufficient data is available for a particular grid point, and averages or weighted averages of variable bin data for the variable values are used, thereby resulting in averages or weighted averages represented in the observation result value and the prediction result value. In some other embodiments, where multiple grids are used for multiple groups, and where there is still insufficient data, the averages of the appropriate group may be used.

Generally speaking, the system works under the proposition that the applications in the prediction set cancel and/or deny at a similar rate to applications in the observation set occupying corresponding grid points within the prediction grid and the observation grid, respectively.

Referring now to FIG. 3, a flowchart illustrates a method 300 including additional details of the methods illustrated in FIGS. 1 and 2 according to embodiments of the present invention. The first step, as represented by block 310, is compressing the multi-dimensional grid into a single dimensional grid wherein each prediction grid point is populated consecutively into the single-dimensional grid from lowest prediction result value to highest prediction result value.

The next step, as represented by block 320, is stepping through the single-dimensional grid from lowest prediction result value to highest prediction result value in order to identify a plurality of grid sections. In some embodiments, the plurality of grid sections are identified based at least in part on a predetermined percentage of the number of prediction grid points having been stepped through.

The next step, as represented by block 330, is assigning a prediction score to each grid section. In some embodiments, the prediction score is assigned incrementally from a set of prediction scores. For example, in one embodiment, the set of prediction scores include numbers zero through nineteen, and each grid section is assigned a number, beginning with zero and ending with nineteen as the plurality of grid sections are stepped through. The prediction scores provide some context to financial institution associates or to other systems for evaluating the predication set applications. For example, it may be predetermined that applications having a prediction score within a particular range may be treated differently than applications outside the range. In some embodiments, the prediction result values include or are the prediction scores, that is, the prediction result values do not require further processing or manipulation in order to communicate a meaningful result. In some embodiments, wherein the prediction result values include or are the prediction scores, they include or are ratios and/or percentages, and in others, they include or are numerical values such as the prediction scores discussed in the examples above.

Referring now to FIG. 4, a flowchart illustrates a method 400 including additional details of the methods illustrated in FIGS. 1 and 2 according to embodiments of the present invention. The first step, as represented by block 410 is calculating the observation result value populated with each observation grid point. As represented by block 420, step 410, in some embodiments, includes dividing the number of past financial product applications in the observation set having a negative result status corresponding with the observation grid point by the total number of past financial product applications in the observation set corresponding with the observation grid point, thereby resulting in the observation result value for the observation grid point.

In some embodiments, the negative result status includes the past financial product application having been canceled by a customer. In some embodiments, the negative result status includes the past financial product application having been denied by a financial institution, either the financial institution considering the new application and/or another financial institution. In yet other embodiments, the negative result status includes the past financial product application having some other type of negative result status or some combination of characteristics resulting in a negative result status.

Referring now to FIG. 5A, a flowchart illustrates a method 500 including additional details of the methods illustrated in FIGS. 1 and 2 according to embodiments of the present invention. The first step, as represented by block 510 is dividing the prediction set into groups based at least in part on one or more variables associated with the one or more variable values. The next step, as represented by block 520, is building a multi-dimensional prediction grid for each group. Each multi-dimensional grid includes, in some embodiments, a plurality of prediction grid points. The next step, as represented by block 530, is assigning a prediction result value for each prediction grid point for each multi-dimensional prediction grid for each group.

Referring now to FIG. 5B, a flowchart illustrates a method 550 including additional details of the methods illustrated in FIGS. 1 and 2 according to embodiments of the present invention. In some embodiments, additional variables are used. For example, in one embodiment, two variables are used to determine prediction scores for a prediction set of applications. In this example, an additional variable is also used in order, for example, to ensure additional accuracy of the results. The first step, as illustrated by block 560, is building a multi-dimensional grid comprising a plurality of new prediction grid points. Each new prediction grid point corresponds to at least one present financial product application in the prediction set and each new prediction grid point is populated with one or more prediction result values and/or one or more prediction scores, as well as a new variable value. As represented by block 570, the next step is assigning a new predication result value for each new prediction grid point based at least in part on a new observation result value. Similar to the method discussed above with reference to FIG. 2 above, several additional steps, such as defining a new observation set, defining a new prediction set, building a new observation grid and the like can be performed in conjunction with method 550.

In some embodiments, an output is initiated and/or generated including each variable in the form of a model slope comparison. After adding the additional variable to the analysis, system performance can be measured to determine whether the additional variable is helpful or not. Improved system performance is indicated by lower cancel and/or deny rates for lower prediction scores and higher cancel/deny rates for higher prediction scores. Such information contributes to further developing the system and better classifying the variables useful in predicting cancel and/or deny rates for applications.

Referring now to FIG. 6, a block diagram illustrates an environment 600 in which the system and the various methods of the present invention operate according to embodiments of the present invention. A financial institution system 601 is a computer system, server, multiple computer systems and/or servers or the like. The financial institution system 601, in the embodiments shown has a communication device 612 communicably coupled with a processing device 614, which is also communicably coupled with a memory device 616. The processing device is configured to control the communication device 612 such that the financial institution system 601 communicates across the network 602 with one or more other systems. The processing device is also configured to access the memory device 616 in order to read the computer readable instructions 618, which in some embodiments includes a financial product application pull-through application 609. The memory device 616 also has a datastore 619 or database for storing pieces of data for access by the processing device 614.

The financial product application pull-through application 609 is configured for instructing the processing device 614 to perform various steps of the methods discussed herein, such as, but not limited to, steps 110, 120, 130, 140, 210, 220, 230, 240, 250, 310, 320, 330, 410, 420, 510, 520, 530, 560, and/or 570, and/or other steps and/or similar steps. In various embodiments, the financial product application pull-through application 609 is included in the computer readable instructions stored in a memory device of one or more systems other than the financial institution system 601. For example, in some embodiments, the financial product application pull-through application 609 is stored and configured for being accessed by a processing device of a third party system 608 and/or a user system 604.

A user system 604 is configured for use by a user 606 such as a customer of the financial institution and/or an applicant submitting or having submitted a new application for a financial product to the financial institution. The user system 604 is a computer system, server, multiple computer system, multiple servers, a mobile device or some other computing device configured for use by a user. The user system 604 has a communication device 622 communicatively coupled with a processing device 624, which is also communicatively coupled with a memory device 626. The processing device 624 is configured to control the communication device 622 such that the user system 604 communicates across the network 602 with one or more other systems. The processing device 624 is also configured to access the memory device 626 in order to read the computer readable instructions 628, which in some embodiments include a web browser application 620. The memory device 626 also has a datastore 629 or database for storing pieces of data for access by the processing device 624. The web browser application 620 is configured to provide the user 606 a user interface for navigating the Internet, and the financial product application pull-through application 609 is configured to provide the user an interface for accessing the financial institution system 601, such as, for example, when the customer is inputting information regarding a new financial product application. As another example, in one embodiment, the user is a financial institution associate and is accessing the financial institution system 601 remotely in order to review one or more financial product applications and/or to run the financial product application pull-through application 609 remotely. In such an embodiment, the web browser application 620 is configured to communicate and work in conjunction with the financial product application pull-through application 609 such that the financial institution associate has access to necessary system functionality.

The third party system 608 is configured for providing one or more of the pieces of data used by the financial institution system 601 when running the financial product application pull-through application 609, including, for example, information/data regarding a current loan held by a new financial product application on a loan maintained by a third party financial institution. In another example, in various embodiments, one or more third party systems 608 store and provide access to other information, such as credit history reports and/or scores used by the financial institution system 601. In some embodiments, the third party system 608 includes a communication device 632 communicatively coupled with a processing device 634, which is also communicatively coupled with a memory device 636. The processing device 634 is configured to control the communication device 632 such that the third party system 608 communicates across the network 602 with one or more other systems. The processing device 634 is also configured to access the memory device 636 in order to read the computer readable instructions 638, which in some embodiments include instructions for communicating with the financial institution system 601, and in some embodiments, includes some or all of the financial product application pull-through application 609.

In various embodiments, one of the systems discussed above, such as the financial institution system 601, is more than one system and the various components of the system are not collocated, and in various embodiments, there are multiple components performing the functions indicated herein as a single device. For example, in one embodiment, multiple processing devices perform the functions of the processing device 614 of the financial institution system 601 described herein.

Embodiments of the invention provide for systems, methods and computer program products for evaluating a prediction set of financial product applications. A method for evaluating a prediction set of financial product applications includes building a multi-dimensional observation grid of observation grid points, each corresponding to at least one past financial product application in an observation set and each populated with the one or more variable values and the observation result value associated with the past financial product application. The method also builds a multi-dimensional prediction grid comprising a plurality of prediction grid points, each corresponding to a present financial product application in the prediction set and populated with one or more variable values of the present financial product application, each also corresponding to an observation grid point. The method also includes assigning a prediction result value for each prediction grid point. In some embodiments, the method defines an observation set and a prediction set comprising at least one past, and at least one present, financial product application, respectively, each application including one or more corresponding variable values.

Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As used herein, unless specifically limited by the context, the term "transaction" may refer to a purchase of goods and/or services (collectively referred to herein as "products"), a withdrawal of funds, an electronic transfer of funds, a payment transaction, a credit transaction, a PIN change transaction or other interaction between a cardholder and the bank maintained a bank account owned by the cardholder. As used herein, a "bank card" refers to a credit card, debit card, ATM card, check card, or the like, or other payment device such as, but not limited to, those discussed above that are not cards. An "account" or "bank account" refers to a credit account, debit account, deposit account, demand deposit account (DDA), checking account, budgeting account or the like. Although the phrases "bank card" and "bank account" include the term "bank," the card or payment device need not be issued by a bank, and the account need not be maintained by a bank and may instead be issued by and/or maintained by other financial institutions.

As used herein, a "processing device" generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities.

As used herein, a "communication device" generally includes a modem, server, transceiver, and/or other device for communicating with other devices directly or via a network, and/or a user interface for communicating with one or more users. As used herein, a "user interface" generally includes a display, mouse, keyboard, button, touchpad, touch screen, microphone, speaker, LED, light, joystick, switch, buzzer, bell, and/or other user input/output device for communicating with one or more users.

As used herein, a "memory device" or "memory" generally refers to a device or combination of devices including one or more forms of non-transitory computer-readable media for storing instructions, computer-executable code, and/or data thereon. Computer-readable media is defined in greater detail herein below. It will be appreciated that, as with the processing device, each communication interface and memory device may be made up of a single device or many separate devices that conceptually may be thought of as a single device.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor/processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, combinations, and modifications of the just described embodiments can be configured without departing from the scope and spirit of the invention. Therefore, it is to be understood that, within the scope of the appended claims, the invention may be practiced other than as specifically described herein.

What is claimed is:

1. A method for evaluating a prediction set of financial product applications, the method comprising:
   defining, by a processing device, an observation set comprising at least one past financial product application, wherein the past financial product application comprises one or more corresponding variable values and an observation result value;
   building, by the processing device, a multi-dimensional observation grid comprising a plurality of observation grid points, each observation grid point corresponding to at least one past financial product application in the observation set and each observation grid point populated with the one or more variable values and the observation result value associated with the at least one past financial product application;
   defining, by the processing device, a prediction set comprising at least one present financial product application, wherein each financial product application comprises one or more corresponding variable values;
   building, by the processing device, a multi-dimensional prediction grid comprising a plurality of prediction grid points, each prediction grid point corresponding to at least one present financial product application in the prediction set and each prediction grid point populated with one or more variable values of the at least one present financial product application, wherein each of the prediction grid points also corresponds to an observation grid point of the observation grid;
   assigning, by the processing device, a prediction result value for each prediction grid point based at least in part on an observation result value populated in the observation grid point corresponding with the prediction grid point;
   compressing, by the processing device, the multi-dimensional prediction grid into a single-dimensional grid wherein each prediction grid point is populated consecutively into the single-dimensional grid from lowest prediction result value to highest prediction result value;
   stepping through, by the processing device, the single-dimensional grid from lowest prediction result value to highest prediction result value to identify a plurality of grid sections; and
   assigning, by the processing device, a prediction score to each grid section, wherein the prediction score assigned to each successive grid section is incrementally assigned from a set of prediction scores.

2. The method of claim 1, wherein the multi-dimensional prediction grid is a three dimensional grid wherein each prediction grid point is populated with two variable values and one prediction result value.

3. The method of claim 1, wherein the plurality of grid sections are identified based at least in part on a predetermined percentage of the number of prediction grid points having been stepped through.

4. The method of claim 3, wherein the predetermined percentage of the number of prediction grid points stepped through is five percent and the plurality of grid sections comprises twenty grid sections.

5. The method of claim 4, wherein the prediction score assigned to each successive grid section is incrementally assigned from a set of prediction scores comprising scores of zero to nineteen, and wherein the prediction score assigned to each successive grid section is incrementally assigned starting with zero and ending with nineteen.

6. The method of claim 1, further comprising:
   calculating, by the processing device, the observation result value populated with each observation grid point, the calculating comprising:
   dividing, by the processing device, the number of past financial product applications in the observation set having a negative result status corresponding with the observation grid point by the total number of past financial product applications in the observation set corresponding with the observation grid point, thereby resulting in the observation result value for the observation grid point.

7. The method of claim 6, wherein the negative result status comprises the past financial product application having been canceled by a customer.

8. The method of claim 6, wherein the negative result status comprises the past financial product application having been denied by a financial institution.

9. The method of claim 1, further comprising:
   dividing, by the processing device, the prediction set into groups based at least in part on one or more variables associated with the one or more variable values;
   building, by the processing device, a multi-dimensional prediction grid for each group, each multi-dimension prediction grid comprising a plurality of prediction grid points; and
   assigning, by the processing device, a prediction result value for each prediction grid point for each multi-dimensional prediction grid for each group.

10. The method of claim 1, further comprising:
    initiating production, by the processing device, of a list of the present financial product applications of the prediction set, the list including the prediction result value assigned to the prediction grid point corresponding to each present financial product application.

11. A system for evaluating a prediction set of financial product applications, the system comprising:
    a processing device configured for:
    defining an observation set comprising at least one past financial product application, wherein the past financial product application comprises two or more corresponding variable values and an observation result value;

building a multi-dimensional observation grid comprising a plurality of observation grid points, each observation grid point corresponding to at least one past financial product application in the observation set and each observation grid point populated with the one or more variable values and the observation result value associated with the at least one past financial product application;

defining a prediction set comprising at least one present financial product application, wherein each financial product application comprises one or more corresponding variable values;

building a multi-dimensional prediction grid comprising a plurality of prediction grid points, each prediction grid point corresponding to at least one present financial product application in the prediction set and each prediction grid point populated with one or more variable values of the at least one present financial product application, wherein each of the prediction grid points also corresponds to an observation grid point of the observation grid;

assigning a prediction result value for each prediction grid point based at least in part on an observation result value populated in the observation grid point corresponding with the prediction grid point;

compressing the multi-dimensional grid into a single-dimensional grid wherein each prediction grid point is populated consecutively into the single-dimensional grid from lowest prediction result value to highest prediction result value;

stepping through the single-dimensional grid from lowest prediction result value to highest prediction result value to identify a plurality of grid sections; and assigning a prediction score to each grid section, wherein the prediction score assigned to each successive grid section is incrementally assigned from a set of prediction scores.

12. The system of claim 11, wherein the multi-dimensional prediction grid is a three dimensional grid wherein each prediction grid point is populated with two variable values and one prediction result value.

13. The system of claim 11, wherein the plurality of grid sections are identified based at least in part on a predetermined percentage of the number of prediction grid points having been stepped through.

14. The system of claim 13, wherein the predetermined percentage of the number of prediction grid points stepped through is five percent and the plurality of grid sections comprises twenty grid sections.

15. The system of claim 14, wherein the prediction score assigned to each successive grid section is incrementally assigned from a set of prediction scores comprising scores of zero to nineteen, and wherein the prediction score assigned to each successive grid section is incrementally assigned starting with zero and ending with nineteen.

16. The system of claim 11, wherein the processing device is further configured for:

calculating the observation result value populated with each observation grid point, the calculating comprising:
dividing, by the processing device, the number of past financial product applications in the observation set having a negative result status corresponding with the observation grid point by the total number of past financial product applications in the observation set corresponding with the observation grid point, thereby resulting in the observation result value for the observation grid point.

17. The system of claim 16, wherein the negative result status comprises the past financial product application having been canceled by a customer.

18. The system of claim 16, wherein the negative result status comprises the past financial product application having been denied by a financial institution.

19. The system of claim 11, wherein the processing device is further configured for:

dividing the prediction set into groups based at least in part on one or more variables associated with the one or more variable values;

building a multi-dimensional prediction grid for each group, each multi-dimension prediction grid comprising a plurality of prediction grid points; and assigning a prediction result value for each prediction grid point for each multi-dimensional prediction grid for each group.

20. The system of claim 11, wherein the processing device is further configured for:

initiating production of a list of the present financial product applications of the prediction set, the list including the prediction result value assigned to the prediction grid point corresponding to each present financial product application.

21. A computer program product comprising a non-transient computer-readable medium comprising instructions for evaluating a prediction set of financial product applications, the instructions comprising:

instructions for defining an observation set comprising at least one past financial product application, wherein the past financial product application comprises two or more corresponding variable values and an observation result value;

instructions for building a multi-dimensional observation grid comprising a plurality of observation grid points, each observation t financial product application in the observation set and each observation grid point populated with the one or more variable values and the observation result value associated with the at least one past financial product application;

instructions for defining a prediction set comprising at least one present financial product application, wherein each financial product application comprises one or more corresponding variable values;

instructions for building a multi-dimensional prediction grid comprising a plurality of prediction grid points, each prediction grid point corresponding to at least one present financial product application in the prediction set and each prediction grid point populated with one or more variable values of the at least one present financial product application, wherein each of the prediction grid points also corresponds to an observation grid point of the observation;

instructions for assigning a prediction result value for each prediction grid point based at least in part on an observation result value populated in the observation grid point corresponding with the prediction grid point;

instructions for compressing the multi-dimensional grid into a single-dimensional grid wherein each prediction grid point is populated consecutively into the single-dimensional grid from lowest prediction result value to highest prediction result value;

instructions for stepping through the single-dimensional grid from lowest prediction result value to highest prediction result value to identify a plurality of grid sections; and instructions for assigning a prediction score to each grid section, wherein the prediction score assigned to each successive grid section is incrementally assigned from a set of prediction scores.

22. The computer program product of claim 21, wherein the multi-dimensional prediction grid is a three dimensional grid wherein each prediction grid point is populated with two variable values and one prediction result value.

23. The computer program product of claim 21, wherein the plurality of grid sections are identified based at least in part on a predetermined percentage of the number of prediction grid points having been stepped through.

24. The computer program product of claim 23, wherein the predetermined percentage of the number of prediction grid points stepped through is five percent and the plurality of grid sections comprises twenty grid sections.

25. The computer program product of claim 24, wherein the prediction score assigned to each successive grid section is incrementally assigned from a set of prediction scores comprising scores of zero to nineteen, and wherein the prediction score assigned to each successive grid section is incrementally assigned starting with zero and ending with nineteen.

26. The computer program product of claim 21, wherein the instructions further comprise:
  instructions for calculating the observation result value populated with each observation grid point, the instructions for calculating comprising:
    instructions for dividing the number of past financial product applications in the observation set having a negative result status corresponding with the observation grid point by the total number of past financial product applications in the observation set corresponding with the observation grid point, thereby resulting in the observation result value for the observation grid point.

27. The computer program product of claim 26, wherein the negative result status comprises the past financial product application having been canceled by a customer.

28. The computer program product of claim 26, wherein the negative result status comprises the past financial product application having been denied by a financial institution.

29. The computer program product of claim 21, wherein the instructions further comprise:
  instructions for dividing the prediction set into groups based at least in part on one or more variables associated with the one or more variable values;
  instructions for building a multi-dimensional prediction grid for each group, each multi-dimension prediction grid comprising a plurality of prediction grid points; and
  instructions for assigning a prediction result value for each prediction grid point for each multi-dimensional prediction grid for each group.

30. The computer program product of claim 21, wherein the instructions further comprise:
  instructions for initiating production of a list of the present financial product applications of the prediction set, the list including the prediction result value assigned to the prediction grid point corresponding to each present financial product application.

31. A method for evaluating a prediction set of financial product applications, the method comprising:
  defining, by a processing device, an observation set comprising at least one past financial product application, wherein the past financial product application comprises one or more corresponding variable values and an observation result value;
  defining, by the processing device, a prediction set comprising at least one present financial product application, wherein each financial product application comprises one or more corresponding variable values;
  building, by the processing device, a multi-dimensional observation grid comprising a plurality of observation grid points, each observation grid point corresponding to at least one past financial product application in the observation set and each observation grid point populated with the one or more variable values and the observation result value associated with the at least one past financial product application;
  building, by the processing device, a multi-dimensional prediction grid comprising a plurality of prediction grid points, each prediction grid point corresponding to at least one present financial product application in the prediction set and each prediction grid point populated with one or more variable values of the at least one present financial product application, each of the prediction grid points also corresponding to an observation grid point of the observation grid;
  assigning, by the processing device, a prediction result value for each prediction grid point based at least in part on the observation result value populated in the observation grid point corresponding with the prediction grid point;
  compressing the multi-dimensional prediction grid into a single-dimensional grid wherein each prediction grid point is populated consecutively into the single-dimensional grid from lowest prediction result value to highest prediction result value;
  stepping through the single-dimensional grid from lowest prediction result value to highest prediction result value to identify a plurality of grid sections; and
  assigning a prediction score to each grid section, wherein the prediction score assigned to each successive grid section is incrementally assigned from a set of prediction scores.

* * * * *

UNITED STATES PATENT AND TRADEMARK OFFICE
CERTIFICATE OF CORRECTION

PATENT NO. : 8,515,841 B2
APPLICATION NO. : 12/879857
DATED : August 20, 2013
INVENTOR(S) : Jason Thalken et al.

It is certified that error appears in the above-identified patent and that said Letters Patent is hereby corrected as shown below:

In the Claims

Claim 21, Column 24, Line 41 and Line 58. Please remove the letter "t" between observation and financial product in line 41. Please insert --grid-- after observation in line 58.

Signed and Sealed this
Eighteenth Day of February, 2014

Michelle K. Lee
*Deputy Director of the United States Patent and Trademark Office*